United States Patent [19]
Gray

[11] Patent Number: 6,008,709
[45] Date of Patent: Dec. 28, 1999

[54] MAGNETIC BUBBLE MOTION PRODUCER

[76] Inventor: Robert W. Gray, 180-4 Poplar St., Rochester, N.Y. 14620

[21] Appl. No.: 09/090,369

[22] Filed: Jun. 4, 1998

[51] Int. Cl.$^6$ ...................................................... H01H 9/00
[52] U.S. Cl. .............................. 335/207; 365/1; 335/306; 310/80
[58] Field of Search .................................... 335/205–207, 335/302–306; 310/80; 361/139, 143, 146, 147; 365/1, 6, 8, 19, 23, 25, 30

[56] References Cited

U.S. PATENT DOCUMENTS

| | | | |
|---|---|---|---|
| 3,890,605 | 6/1975 | Sionczewcki | 365/5 |
| 3,979,737 | 9/1976 | Braginski | 340/174 |
| 4,025,911 | 5/1977 | Bobeck et al. | 340/174 |
| 4,027,295 | 5/1977 | Maegawa et al. | 340/174 |
| 4,178,636 | 12/1979 | Argyle et al. | 365/30 |
| 4,315,214 | 2/1982 | Kataoka | 324/208 |
| 5,148,068 | 9/1992 | Kushida et al. | 310/46 |
| 5,229,738 | 7/1993 | Knapen | 335/303 |
| 5,717,259 | 2/1998 | Scheynayder | 310/11 |

OTHER PUBLICATIONS

"Formation of Normal and Hard Bubbles by Cutting Strip Domains", by Hideki Nishida, Tsutomu Kobayashi & Yutaka Sugita IEEE Transactions on Magnets, vol. MAG–9, No. 3, Sep. 1973, pp. 517–520.

"Magnetic Bubbles" by T. H. O'Dell, Halsted Press Book, John Wiley & Sons, New York–Toronto 1974 (No Month) Title Page and pp. 4–9.

"Ferromagneto Dynamics The Dynamics of Magnetic Bubbles, Domains & Domain Walls", by T. H. O'Dell, Halsted Press Book, John Wiley & Sons, New York 1981, Title Page & pp. 16–24. (No Month).

"Forced Shear Flow of Magnetic Bubble Arrays", by R. Seshadri and R. M. Westervelt, The American Physical Society, Physical Review Letters, vol. 70, No. 2, Jan. 11, 1993, pp. 234–237.

"Commensurate–Incommensurate Transitions in Magnetic Bubble Arrays with Periodic Line Pinning" by Junmin Hu & R. M. Westervelt, The American Physical Society, Physical Review B, vol. 55, No. 2, Jan. 1, 1997–11, pp. 771–774.

*Primary Examiner*—Lincoln Donovan
*Assistant Examiner*—Tuyen Nguyen
*Attorney, Agent, or Firm*—Eugene Stephens & Associates

[57] ABSTRACT

Motion of a magnetic bubble material is caused by subjecting magnetic bubbles within the material to a magnetic field gradient. The bubbles respond to the magnetic field gradient by producing forces angled from the direction of the magnetic field gradient, and resistance of the magnetic bubble material to internal movement of the magnetic bubbles causes the material to move in response to the magnetic bubble forces.

40 Claims, 4 Drawing Sheets

MAGNETIC BUBBLE MOTION PRODUCER

TECHNICAL FIELD

Magnetic bubble materials deployed as motion producers.

BACKGROUND

Magnetic bubbles are generally cylindrical-shaped regions within a material in which a magnetization direction within the bubbles is opposite to a magnetization direction in the material outside the bubbles. Materials producing magnetic bubbles are often thin crystalline films, but magnetic bubbles are not limited to such materials.

Magnetic bubbles have been studied primarily as prospects for information storage and processing. Although considerable knowledge has been developed on magnetic bubbles, they have so far not been widely exploited for other uses.

From the extensive literature on magnetic bubbles, the following selections provide basic information on magnetic bubble characteristics, to aid in understanding this invention:

"Formation of Normal and Hard Bubbles by Cutting Strip Domains", by Hideki Nishida, Tsutomu Kobayashi, and Yutaka Sugita, IEEE Transactions on Magnetics, Vol. MAG-9, No. 3, September 1973, pages 517–520.

*MAGNETIC BUBBLES* by T. H. O'Dell, Halsted Press Book, John Wiley & Sons, New York, 1974, title page and pages 4–9.

*Ferromagnetodynamics, The dynamics of magnetic bubbles, domains and domain walls,* by T. H. O'Dell, Halsted Press Book, John Wiley & Sons, New York, 1981, title page and pages 16–24.

"Forced Shear Flow of Magnetic Bubble Arrays", by R. Seshadri and R. M. Westervelt, The American Physical Society, Physical Review Letters, Volume 70, Number 2, Jan. 11, 1993, pages 234–237.

"Commensurate-incommensurate transitions in magnetic bubble arrays with periodic line pinning", by Junmin Hu and R. M. Westervelt, The American Physical Society, Physical Review B, Volume 55, Number 2, Jan. 1, 1997-II, pages 771–774.

SUMMARY OF THE INVENTION

My invention proposes ways that magnetic bubbles and magnetic bubble materials that can be exploited to produce motion. My invention advances beyond basic research by others on the properties of magnetic bubbles and proposes ways of producing motion using forces resulting from responses of magnetic bubbles to a magnetic field gradient.

Producing motion with magnetic bubbles according to my invention requires a material having a multitude of magnetic bubbles and a source that applies a magnetic field gradient to the material, causing the bubbles to respond. The material is disposed for movement, and the bubbles have suitable states so that a resultant of the forces produced by the bubbles in response to the magnetic field gradient is oriented between zero to 90 degrees from the direction of the magnetic field gradient. Another requirement is for the material containing the magnetic bubbles to offer resistance to movement of the magnetic bubbles within the material. The resultant of the forces on the bubbles then causes the material to move. Such movement of the material can be exploited in many ways to achieve beneficial results.

DRAWINGS

DETAILED DESCRIPTION

Figure 1:
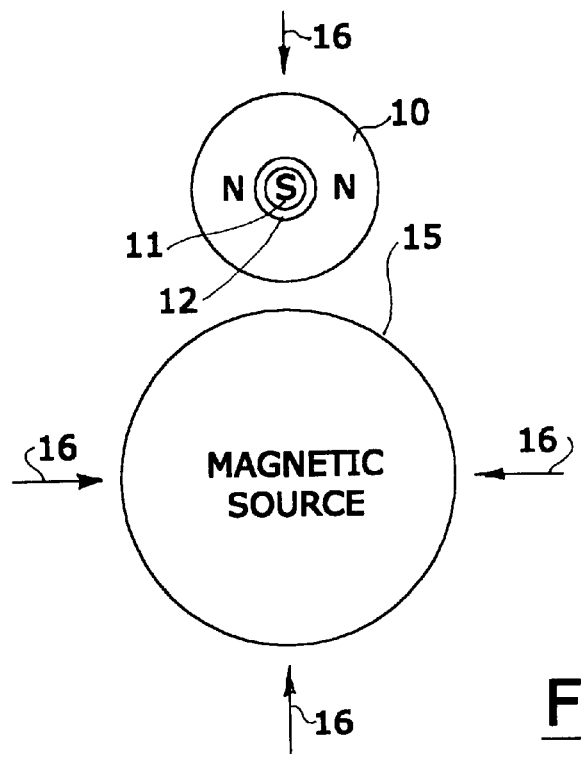
FIGS. 1 and 2 are schematic drawings of a magnetic source producing a magnetic field having a gradient direction intersecting an illustrative magnetic bubble in a magnetic bubble material.
Figure 2:
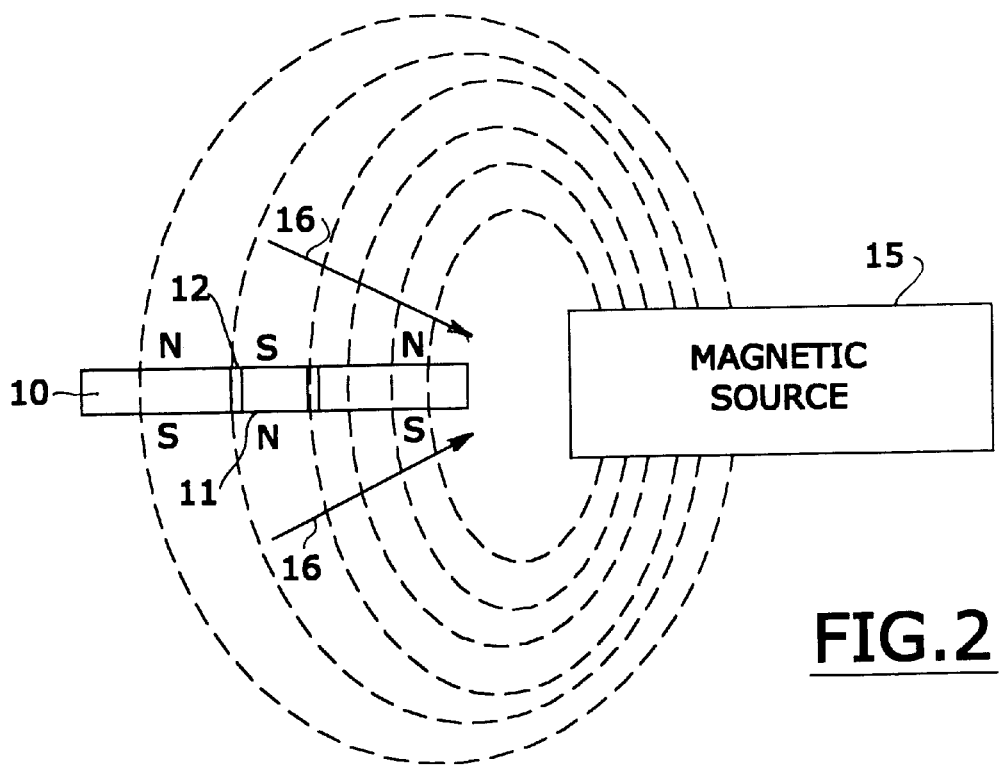

FIGS. 1 and 2 show a magnetic bubble material 10 that is simplified by having a single magnetic bubble 11 with a domain wall 12. Bubble material 10 is arranged near a magnetic source 15 producing a magnetic field shown in broken lines and having a field gradient direction 16 pointing in the direction of increasing field strength.

The S and N labels showing magnetic field polarity indicate that bubble 11 has a magnetization polarity opposite from the magnetization polarity of the rest of magnetic bubble material 10. The characteristics of magnetic bubbles derive from this fact.

Magnetic bubbles can exist in many different materials. Some types of materials that have been investigated are:

Orthoferrites

Garnets ((EuY)(3)(GaFe)(5)O(12)), for example

Hexagonal ferrites BaFe(12)O(19), for example.

Other materials are also known to support magnetic bubbles, and research has not yet identified all the possibilities for magnetic bubble materials.

A material that supports magnetic bubbles will preferably have a multitude of magnetic bubbles, rather than a few. Especially for purposes of producing movement according to my invention, a magnetic bubble material that supports a large number of magnetic bubbles should be selected.

Another property of a magnetic bubble material is that a magnetic field gradient can move the bubbles within the material. Movement and direction of movement of magnetic bubbles within magnetic bubble materials have been studied, and researchers have noticed that magnetic bubble materials offer resistance to bubble movement. Magnetic bubbles also repel each other and resist being packed too closely together.

Figure 3:
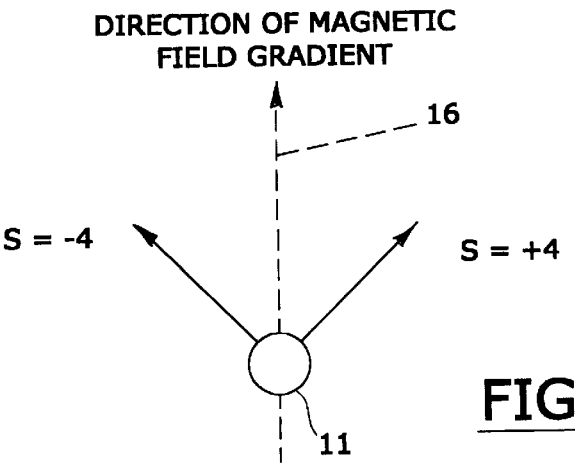
FIG. 3 is a schematic diagram of forces on a magnetic bubble relative to a magnetic field gradient direction, depending on bubble states.

An important aspect of magnetic bubble movement within a magnetic material is illustrated in FIG. 3. Researchers have assigned to magnetic bubbles state or S numbers indicating their direction of movement from the direction of a magnetic field gradient 16. FIG. 3 illustrates examples of forces resulting from responses of a magnetic bubble 11 to magnetic field gradient 16, depending on two possible states of the bubble's domain wall 12. The examples picked for FIG. 3 are S=−4 and S=+4, showing force directions oblique to magnetic field gradient direction 16 and on respectively opposite sides of gradient direction 16. Positive and negative states 1, 2, and 3 are also possible for magnetic bubbles; and higher numbered states are also possible. Lower magnitude state numbers ISI generally cause bubble movement at smaller angles from the direction of the magnetic field gradient. Bubbles with higher magnitude state numbers are called "hard" bubbles.

Magnetic materials generally respond to magnetic fields by producing forces toward or away from a magnetic source, in the direction of a magnetic field gradient. Magnetic bubbles, however, can respond to a magnetic field gradient by producing forces oblique to the magnetic field gradient direction, providing the bubbles have a state number larger than zero, which is preferred for magnetic bubbles to be used in practicing this invention. The force produced by a magnetic bubble's response to a magnetic field gradient will be between zero and 90 degrees right or left from the direction of the magnetic field gradient.

Because of the computer technology goal of most investigators, bubble material research has been directed mostly toward achieving smaller and smaller bubble sizes and faster bubble mobility. Additionally, hard bubbles have been considered undesirable for computer technology purposes so that methods of suppressing them have been sought. However, for producing motion according to my invention, just the opposite is desired; hard bubbles are preferred.

Figure 4:
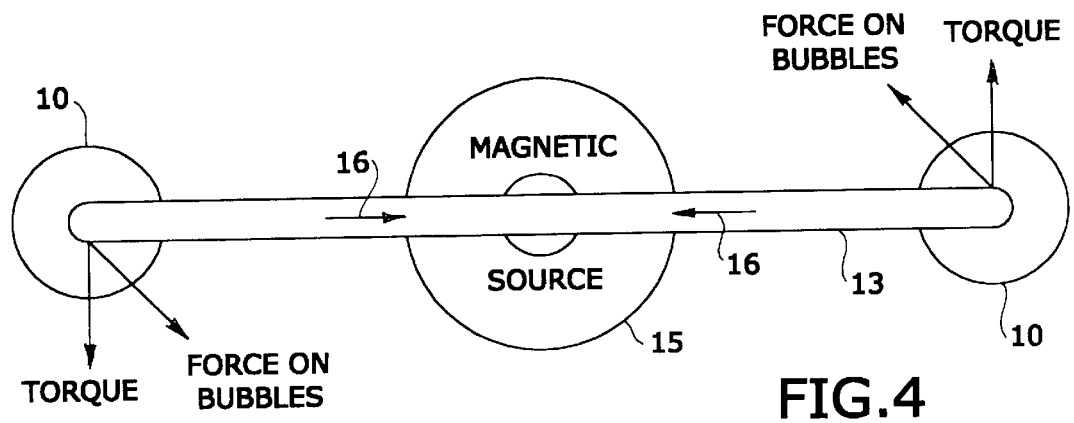
FIG. 4 is a schematic plan view of a motion-producing device using a magnetic source and a pair of magnetic materials mounted for movement around the source.

FIG. 4 schematically shows a simple way of accomplishing the goal of my invention, which is to move a magnetic bubble material in ways not otherwise possible in the absence of magnetic bubbles. A magnetic source 15 can produce forces on bubbles in magnetic bubble materials 10 arranged on opposite ends of a movable arm 13; and such forces can result in torque applied to arm 13, as illustrated. The bubbles in material 10 are preferably predominantly of the same S sign and are preferably hard bubbles with higher S values so that a resultant of all the forces produced by all the bubbles in response to the field of magnetic source 15 is oblique to arm 13, which lies on the direction of a magnetic field gradient 16 of source 15. Two factors then lead to movement of the bubble materials 10. One factor translating bubble forces into torque is the resistance that materials 10 offer to internal movement of bubbles, and another factor is that materials 10 are constrained by arm 13 against moving in the direction of magnetic field gradient 16. The resulting torque moves arm 13 counterclockwise around source 15.

For effectively causing movement of magnetic bubble materials, it is desirable that the materials offer a high resistance, to internal movement of magnetic bubbles. Some level of bubble movement resistance is inherent in magnetic bubble materials, and there are ways that internal bubble movement resistance can be increased. Surface treatment of the magnetic material is known to produce resistance to bubble movement in the material. Photolithography techniques have been used to deposit permalloy dots and lines onto the surface of magnetic bubble material which effectively pin the magnetic bubbles in the material. Another possibility is generating magnetic bubbles within a juxtaposed multitude of small increments of magnetic bubble material, such as schematically illustrated for rotor 20 of FIG. 5. This can confine bubble movement to each increment of bubble material.

Other expedients for increasing movement force applied to a magnetic bubble material are to increase the number of magnetic bubbles contained within the material, adjust the hardness of the magnetic bubbles, and increase the proportion of the magnetic bubbles that all have the same state sign. It is possible to produce significant movement force from the responses of a multitude of magnetic bubbles to a magnetic field gradient.

Figure 5:
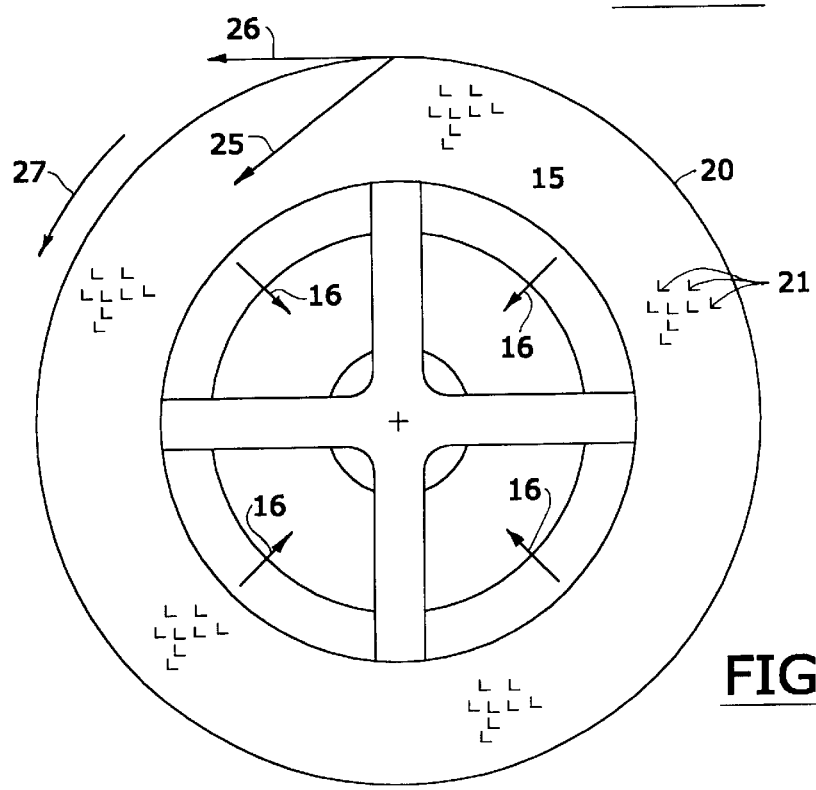
FIG. 5 is a schematic plan view of a device for producing rotational motion of a magnetic bubble material around a magnetic source.

As illustrated in FIG. 5, rotor 20 of magnetic bubble material is divided into a multitude of "tiles" of discrete increments of magnetic bubble material, each containing a multitude of magnetic bubbles whose movement within rotor 20 is thereby restricted. By making the magnetic bubbles in rotor 20 predominantly positive or predominantly negative in their state signs, it is possible to produce a resultant force 25 from the magnetic bubbles in rotor 20 responding to the magnetic field gradient of source 15, as indicated by arrows 16. This produces a torque 26 causing rotor 20 to rotate counterclockwise as indicated by arrow 27. Changing the bubbles' state sign will cause the rotor to rotate in the opposite direction.

Figure 6:
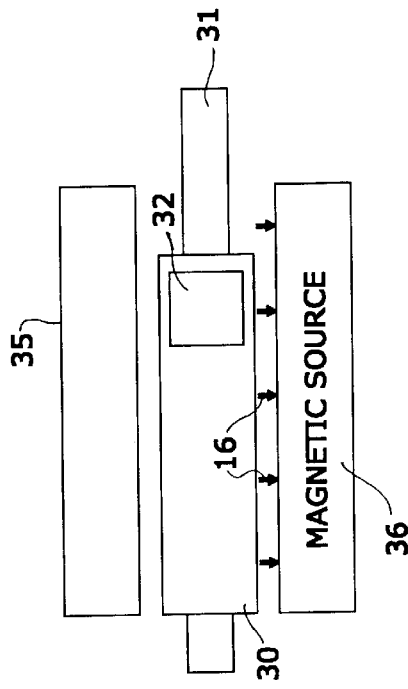
FIGS. 6–9 are schematic views of alternative forms of motion-producing devices, arranged to have an optical effect in FIGS. 6 and 7 and an electrical effect in FIGS. 8 and 9.
Figure 7:
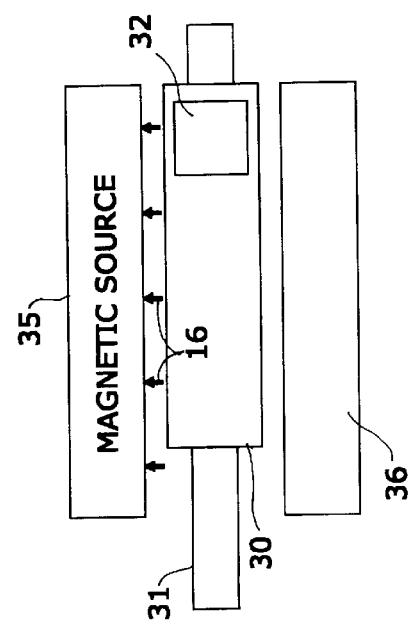

Movements produced by magnetic bubble materials are not limited to rotation. FIGS. 6–9 show linearly reciprocal motions produced by magnetic bubble materials 30 mounted to move along slides 31. In the embodiment illustrated in FIG. 6, magnetic bubble material 30 carries a mirror 32 to have an optical effect when bubble material 30 moves. Rightward movement as illustrated in FIG. 6 is caused by energizing a magnetic source 35 having a magnetic field gradient directed transversely of bubble material 30. Bubble forces oblique to the magnetic field gradient direction then produce a resultant force, causing magnetic bubble material 30 to move to the right along slide 31, to the position illustrated in FIG. 6. Deenergizing magnetic source 35 and energizing magnetic source 36 causes an opposite movement of magnetic material 30, to the position illustrated in FIG. 7. This comes from the magnetic bubble reaction to a magnetic field gradient in an opposite transverse direction.

Figure 8:
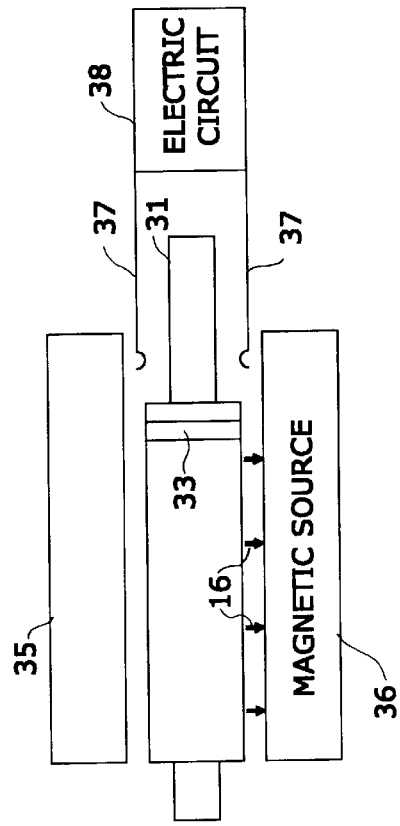
Figure 9:
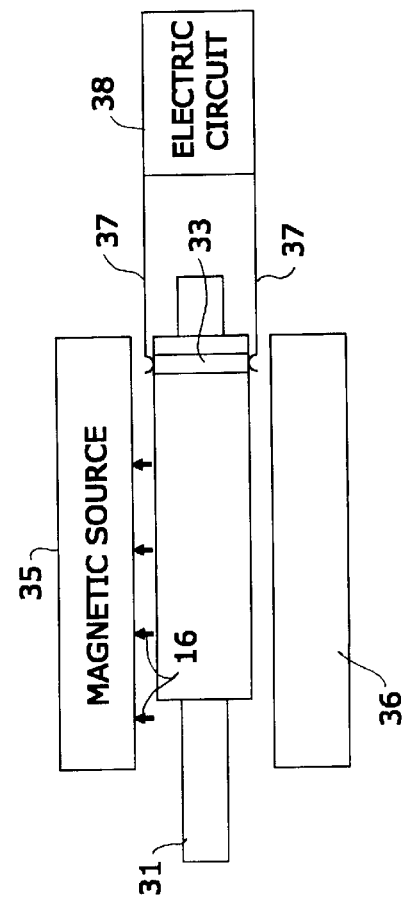

The same sort of reciprocal motion of magnetic material 30 occurs in the illustration of FIGS. 8 and 9 to move an electrically conductive strip 33 into engagement with contacts 37 of an electric circuit 38 in a position shown in FIG. 8. Leftward movement to the position shown in FIG. 9 opens contacts 37 and electric circuit 38.

FIGS. 6–9 schematically show both reciprocal motion and optical and electrical effects that are derivable from movement of magnetic bubble materials. The effects of magnetic bubble material movement, whether optical, electrical, or mechanical, can be combined in multitudes of ways with different material movement possibilities. FIGS. 6–9 are thus illustrative, rather than limiting.

Figure 11:
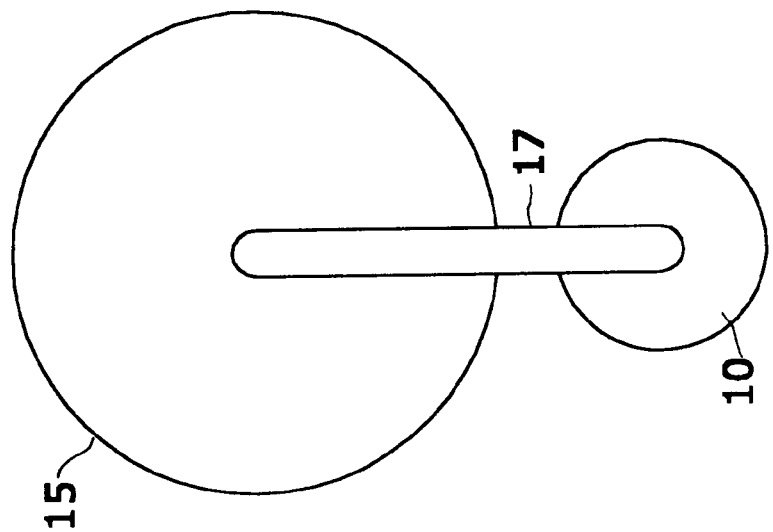
FIGS. 10 and 11 are schematic views of a magnetic bubble motion-producing device that moves both in response to a magnetic field and in the absence of a magnetic field.
Figure 10:
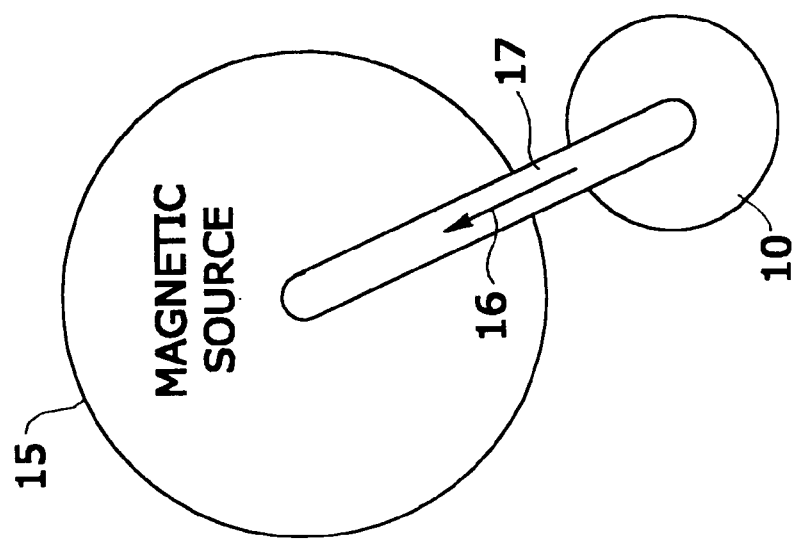

An arcuate reciprocal motion of a magnetic bubble material 10 is illustrated in FIGS. 10 and 11. A magnetic source 15 is activated in FIG. 10 to move magnetic bubble material 10 to its illustrated position, as supported by arm 17. Deenergizing magnetic source 15 allows magnetic material 10 to move gravitationally to the position of FIG. 11. Springs and other resilient elements can also accomplish return movement from a magnetically energized position of a magnetic bubble material.

A source of magnetic energy for moving magnetic bubble materials need not be an electromagnet. A magnetic field gradient produced by a permanent magnet can also cause movement of magnetic bubble materials.

I claim:

1. A motion producer comprising:
   a. a movably disposed material containing a multitude of magnetic bubbles;
   b. the material having resistance to movement of the magnetic bubbles within the material;
   c. a source producing a magnetic field gradient in the region of the material; and
   d. the magnetic bubbles being arranged to respond to the magnetic field gradient to produce a force causing the material to move.

2. The motion producer of claim 1 wherein movement of the material has a mechanical effect.

3. The motion producer of claim 1 wherein movement of the material has an electrical effect.

4. The motion producer of claim 1 wherein movement of the material has an optical effect.

5. The motion producer of claim 1 wherein a second source produces a second magnetic field gradient oriented so that a response of the magnetic bubbles to the second magnetic field gradient produces a force causing the material to move in a second direction.

6. The motion producer of claim 1 wherein a resultant of the forces produced by each of the magnetic bubbles is oriented between zero and 90 degrees from a direction of the magnetic field gradient.

7. The motion producer of claim 1 wherein the source producing the magnetic field gradient is intermittent, and movement of the material occurs while the magnetic field gradient is applied.

8. The motion producer of claim 1 wherein the movement of the material is in a direction different from a direction of the magnetic field gradient.

9. The motion producer of claim 1 wherein a source is energizable to reverse a polarity of the magnetic field gradient and thereby alter a direction of movement of the material.

10. The motion producer of claim 1 wherein the material is constrained from movement in a direction of the magnetic field gradient.

11. A motion-producing device comprising:
   a. a material containing a multitude of magnetic bubbles that respond to a magnetic field gradient;
   b. the material being disposed for movement; and
   c. the material being arranged to resist internal movement of the magnetic bubbles so that the response of the magnetic bubbles to the magnetic field gradient causes movement of the material.

12. The device of claim 11 wherein the bubbles have S-values of predominantly the same sign.

13. The device of claim 11 including a source producing the magnetic field gradient oriented to establish a direction of movement of the material.

14. The device of claim 13 wherein the source operates intermittently.

15. The device of claim 13 including a second source producing a second magnetic field gradient in a second orientation establishing a second direction of movement of the material.

16. The device of claim 15 wherein the sources operate alternately.

17. The device of claim 11 wherein the responses of the magnetic bubbles to the magnetic field gradient produce a resultant force angled between zero and 90 degrees to a direction of the magnetic field gradient.

18. The device of claim 11 wherein the magnetic field gradient can be changed in polarity to alter a direction of movement of the material.

19. The device of claim 11 wherein the material is constrained from movement in a direction of the magnetic field gradient.

20. The device of claim 11 wherein the movement of the material is in a direction different from a direction of the magnetic field gradient.

21. A system for moving a movable element, the system comprising:
   a. the movable element including a material having a multitude of magnetic bubbles and a resistance to movement of the magnetic bubbles within the material;
   b. a source producing a magnetic field gradient in a region of the material; and
   c. the magnetic field gradient urging the bubbles in a movement direction opposed by the resistance so that the urging causes the movable element to move.

22. The system of claim 21 wherein movement of the movable element has a mechanical effect.

23. The system of claim 21 wherein movement of the movable element has an electrical effect.

24. The system of claim 21 wherein movement of the movable element has an optical effect.

25. The system of claim 21 wherein the movement direction in which the bubbles are urged is zero to 90 degrees from an increasing direction of the magnetic field density.

26. The system of claim 21 wherein a resultant of forces produced by the bubbles in response to the magnetic field gradient is inclined from a direction of the magnetic field gradient.

27. The system of claim 21 wherein a second source produces a second magnetic field gradient oriented to urge the bubbles in a second movement direction.

28. The system of claim 21 wherein the source alters the magnetic field gradient to alter a direction of movement of the movable element.

29. The system of claim 21 wherein the source operates intermittently.

30. The system of claim 21 wherein the material is constrained from movement in a direction of the magnetic field gradient.

31. A system of producing motion from energy of a magnetic field having a gradient oriented in a direction of increasing magnetic energy, the system comprising:
   a. the magnetic field being applied to a material having a multitude of magnetic bubbles and a resistance to movement of the magnetic bubbles within the material;
   b. the magnetic bubbles producing forces on the material in response to the magnetic field; and
   c. a resultant of the forces produced by the bubbles is oriented from zero to 90 degrees from the direction of the magnetic field gradient, causing the material to move.

32. The system of claim 31 wherein movement of the material is in a direction different from the direction of the magnetic field gradient.

33. The system of claim 31 wherein movement of the material has a mechanical effect.

34. The system of claim 31 wherein movement of the material has an electrical effect.

35. The system of claim 31 wherein movement of the material has an optical effect.

36. The system of claim 31 wherein the magnetic field is applied intermittently.

37. The system of claim 31 including more than one source of a magnetic field, each source producing a magnetic field gradient oriented in a different direction, and the sources being operable at different times to produce different movements of the material.

38. The system of claim 31 wherein a polarity of the magnetic field is reversible.

39. The system of claim 38 wherein a direction of movement of the material is reversible.

40. The system of claim 31 wherein the material is constrained from movement in a direction of the magnetic field gradient.

* * * * *